(12) United States Patent
Borys et al.

(10) Patent No.: US 8,020,683 B2
(45) Date of Patent: Sep. 20, 2011

(54) MAGNETIC FRICTION CLUTCH

(75) Inventors: M. Shehokin Borys, Thornhill (CA); John Grach, Oakville (CA); Dan Cosmin, Richmond Hill (CA); Victor Gusev, Richmond Hill (CA)

(73) Assignee: Magna Closures Inc., Newmarket (CA)

( * ) Notice: Subject to any disclaimer, the term of this patent is extended or adjusted under 35 U.S.C. 154(b) by 861 days.

(21) Appl. No.: 11/955,427

(22) Filed: Dec. 13, 2007

(65) Prior Publication Data
US 2008/0142327 A1 Jun. 19, 2008

(51) Int. Cl.
*F16D 27/115* (2006.01)
(52) U.S. Cl. .............. 192/84.91; 192/70.14; 192/107 M
(58) Field of Classification Search ................ 192/84.91
See application file for complete search history.

(56) References Cited

U.S. PATENT DOCUMENTS

| | | | | |
|---|---|---|---|---|
| 2,875,875 A | * | 3/1959 | Prahauser et al. | 192/84.91 |
| 2,966,975 A | * | 1/1961 | Wiedmann et al. | 192/84.91 |
| 3,093,227 A | * | 6/1963 | Straub et al. | 192/84.91 |
| 4,566,574 A | | 1/1986 | Marshall | |
| 6,092,336 A | | 7/2000 | Wright et al. | |
| 6,755,291 B2 | * | 6/2004 | Hirota et al. | 192/35 |
| 6,805,971 B2 | * | 10/2004 | Talia et al. | 428/553 |
| 7,140,150 B2 | | 11/2006 | Sakai et al. | |
| 7,175,228 B2 | | 2/2007 | Mrkovic et al. | |
| 2003/0136626 A1 | | 7/2003 | Ciaramitaro et al. | |
| 2003/0217904 A1 | * | 11/2003 | Ando et al. | 192/107 M |

FOREIGN PATENT DOCUMENTS

DE 102004023098 A1 12/2005
JP 01288630 A * 11/1989

* cited by examiner

*Primary Examiner* — Richard M. Lorence
(74) *Attorney, Agent, or Firm* — Magna International Inc.

(57) ABSTRACT

A novel magnetic friction clutch is disclosed which is capable of relatively high torque transfer for friction discs of a given diameter, compared to prior art magnetic clutches. A friction coating with good magnetic permeability, such as Ferrous Aluminide or the like, is applied to inner and outer annular regions of the three friction discs and increases the frictional coefficient of the discs with little reduction in the clamping force developed through the clutch.

9 Claims, 4 Drawing Sheets

MAGNETIC FRICTION CLUTCH

FIELD OF THE INVENTION

The present invention relates to a clutch mechanism for drive systems such vehicle door or liftgate opening mechanisms. More particularly, the present invention relates to a magnetic friction clutch for such drive systems and other suitable applications.

BACKGROUND OF THE INVENTION

Many drive systems, such as vehicle liftgate openers, include a clutch which operates to disengage the electric drive from the mechanism which normally operates the liftgate so that manual operation of the liftgate can be achieved. Conventionally, such clutches have been mechanical toothed clutches which provide the necessary torque handling capabilities required for drive systems for operating heavy devices such as vehicle liftgate openers.

While such toothed clutches have been widely used, they do suffer from disadvantages. In particular, such clutches must only be engaged and disengaged in no-load conditions, with no relative movement between the tooth rings, or damage to the clutch components can occur. Further, in the event of an overload condition occurring in a drive system including a toothed clutch, there is a high probability that damage will occur to components in the drive system as the clutch cannot slip and thus the drive components must transfer the overload forces. Also, toothed clutches are relatively expensive to manufacture.

A known alternative to mechanical toothed clutches is to employ magnetic friction clutches wherein a driving disc is brought into frictional contact with a driven disc by an electromagnetic field. When the electromagnetic field is energized, a normal force is created through the discs urging the driven and driving discs together and torque at the driving disc is transferred to the driven disc by the frictional force between the discs. Conversely, when the electromagnetic field is de-energized, the normal force is removed and substantially no torque is transferred between the driven and driving discs.

Unlike toothed clutches, when magnetic friction clutches are subjected to overload conditions and/or dynamic loads, they can momentarily slip, preventing mechanical damage to the clutch and/or driving and driven devices.

While prior art magnetic friction clutches are used in a variety of applications and offer advantages over toothed clutches, they also suffer from disadvantages when the space into which the clutch is to be installed is limited and/or the torque that the clutch must transfer is relatively high. Generally, the torque transfer capability of known magnetic friction clutches is related to the diameter of the driven and driving discs and higher torque transfer capabilities can only be achieved with relatively large disc diameters. In particular, known magnetic friction clutches have not been suitable for vehicular applications, such as liftgate openers, which require a relatively high torque transfer capability and yet have limited volume in which the clutch can be installed.

SUMMARY OF THE INVENTION

It is an object of the present invention to provide a novel magnetic friction clutch which obviates or mitigates at least one disadvantage of the prior art.

According to a first aspect of the present invention, there is provided a magnetic friction clutch, comprising: a driving gear to receive torque from a prime mover; a output shaft to output torque from the prime mover to a driven device when the clutch is engaged; three friction discs: a first disc of the three friction discs being a first driving disc, each driving disc rotating with the drive gear and being moveable along the output shaft; a second disc of the friction discs being a first driven disc, each driven disc rotating with the output shaft; and a third disc of the friction discs being one of a second driven disc or second driving disc, where each friction disc includes a frictional coating applied to its surfaces to enhance the frictional coefficient between respective discs; and a magnetic circuit including an electromagnetic coil operable, when energized, to clamp the three friction discs together to allow torque to be transferred from a prime mover to a driven device through the friction discs.

Preferably, the frictional coating is Ferrous Aluminide. Also preferably, the coating is applied by thermal spraying.

According to another aspect of the present invention, there is provided a magnetic friction clutch, comprising: a driving gear to receive torque from a prime mover; an output shaft to output torque from the prime mover to a driven device when the clutch is engaged; three friction discs, each friction disc having an outer annular region separated from an inner annular region by at least two air gaps, the area of the outer annular region being substantially the same as the area of the inner annular region and wherein a frictional coating is applied to at least the inner annular area and outer annular area of each friction disc: a first disc of the three friction discs being a first driving disc rotating with the drive gear and being moveable along the output shaft; a second disc of the friction discs being a first driven disc rotating with the output shaft being moveable along the output shaft; and a third disc of the friction discs being a second driving disc rotating with the drive gear and being moveable along the output shaft; a rotor which turns with the output shaft; an armature which turns with the driving gear; a magnetic core; and a magnetic circuit including an electromagnetic coil located within an annular recess formed between the rotor and the magnetic core, the electromagnetic coil being operable, when energized, to clamp the three friction discs and the armature and rotor together to allow torque to be transferred from a prime mover to a driven device through the friction discs.

Preferably, the frictional coating is also applied to the rotor and the armature. Also preferably, the frictional coating is Ferrous Aluminide.

The present invention provides a novel magnetic friction clutch which is capable of relatively high torque transfer for friction discs of a given diameter, compared to prior art magnetic clutches. A friction coating with a good magnetic permeability, such as Ferrous Aluminide or the like, is applied to inner and outer annular regions of the three friction discs and increases the frictional coefficient of the discs with little reduction in the clamping force developed through the clutch.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
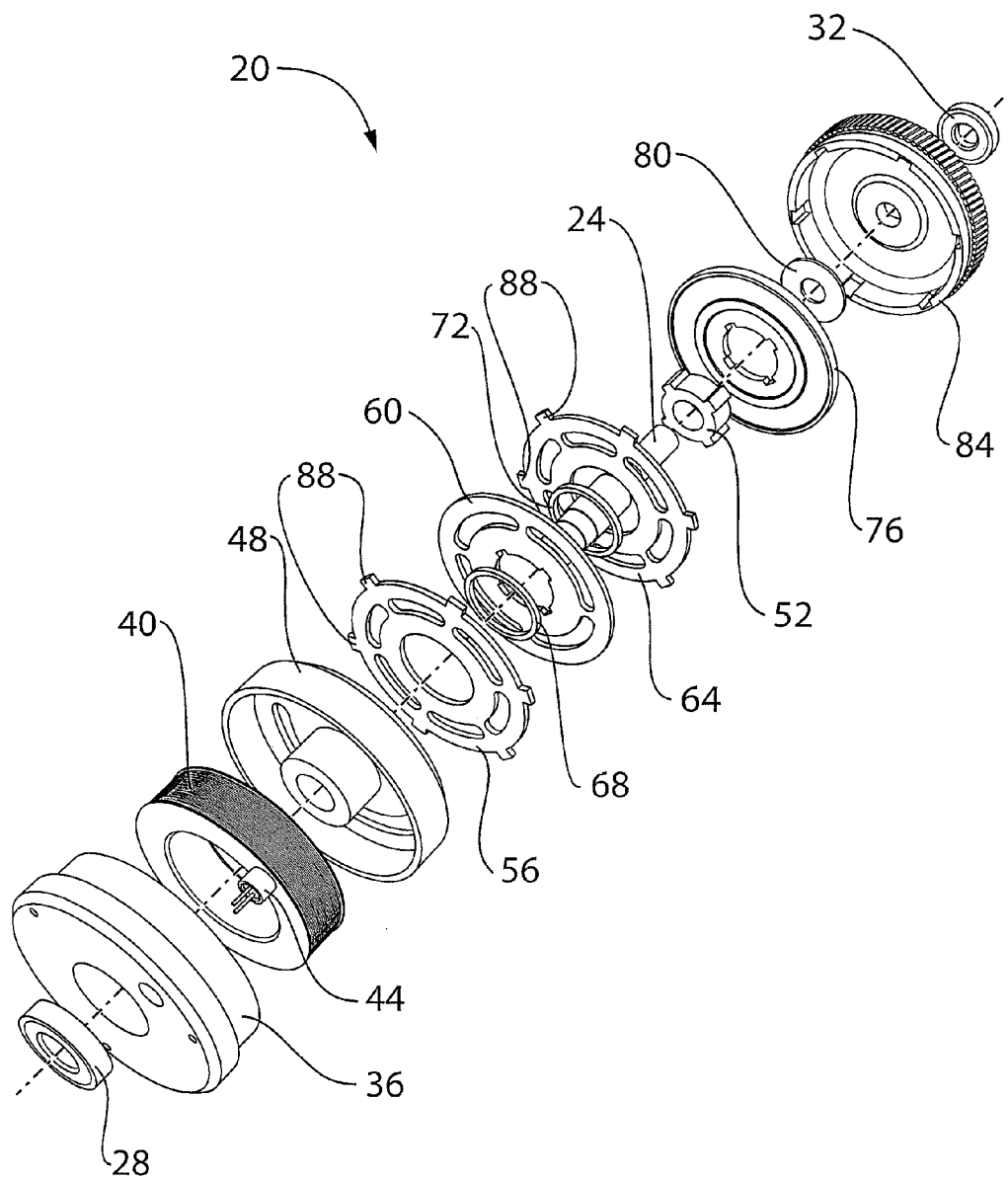
FIG. 1 shows an exploded view of a magnetic friction clutch in accordance with the present invention.
Figure 2:
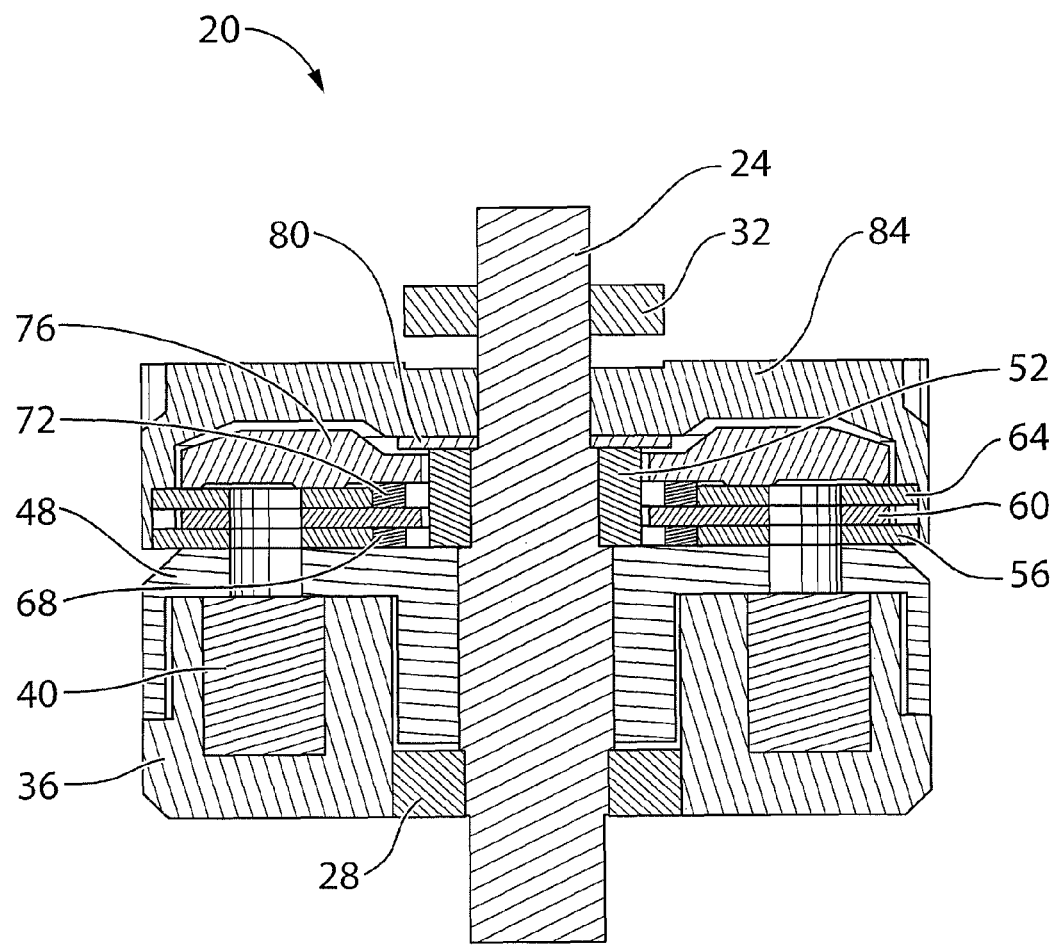
FIG. 2 shows a cross section of the magnetic friction clutch of FIG. 1.

An embodiment of a magnetic friction clutch, in accordance with the present invention, is indicated generally at 20 in FIGS. 1 and 2. Clutch 20 includes an output shaft 24 which rotates on a pair of bearings 28 and 32. Output shaft 24 is connectable to a device to be driven, such as a vehicle liftgate or other device that requires torque from a prime mover, delivered via clutch 20.

In the embodiment illustrated in FIGS. 1 and 2, it is contemplated that the device to be driven will connect to the end of output shaft 24 adjacent bearing 28, but it is also contemplated that, in other embodiments, the device to be driven can be connected to the end of output shaft 24 adjacent bearing 32.

Clutch 20 further includes a magnetic core 36 which holds an electromagnetic winding 40. Magnetic core 36 is preferably manufactured from a material, such as iron, with good magnetic permeability which promotes the creation and forming of magnetic fields.

Electromagnetic winding 40 is energized via a suitable electrical current provided at a set of terminals 44 included on winding 40 for this purpose, and terminals 44 extend through magnetic core 36 to connect to the supply of electrical current. Bearing 28 is mounted within core 36, such that output shaft 24 can rotate freely with respect to core 36 while bearing 32 is mounted in a housing (not shown) for clutch 20.

A rotor 48 is fixed to output shaft 24 and turns with it. Rotor 48 includes a cylindrical wall at its outer periphery which extends back towards core 36 such that, when clutch 20 is assembled, winding 40 is received in an enclosure formed by core 36 and rotor 48, as best seen in FIG. 2. Like core 36, rotor 48 is also is preferably manufactured from a material, such as iron, with good magnetic permeability which promotes the creation and forming of magnetic fields.

Output shaft 24 further includes a hub 52 which rotates with shaft 24 and rotor 48. Hub 52 includes one or more index features, such as the illustrated set of four teeth. A set of three friction discs, including a first driving disc 56, a driven disc 60 and a second driving disc 64 are arranged along output shaft 24 adjacent rotor 48.

Figure 3:
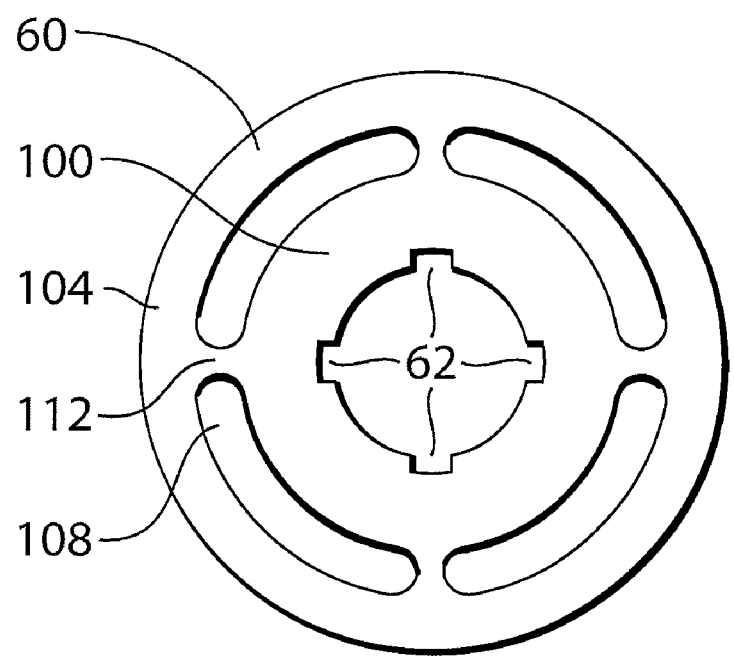
FIG. 3 shows a driven disc used with the magnetic friction clutch of FIG. 1.

As best seen in FIG. 3, driven disc 60 includes, at its radial center, a set of index features 62 which are complementary to those of hub 52 and thus driven disc 60 turns with output shaft 24 but is moveable along output shaft 24.

Each of first driving disc 56 and second driving disc 64 do not directly engage hub 52, nor shaft 24, and as described below, move independently of shaft 24 when winding 40 is de-energized.

Each of first driving disc 56 and second driving disc 64 are biased away from driven disc 60 by a respective one of cylindrical springs 68 and 72 and each of driven disc 60, first driving disc 56 and second driving disc 64 have a friction coating applied to their faces, as described below.

An armature 76, also preferably manufactured from a material, such as iron, with good magnetic permeability which promotes the creation and forming of magnetic fields, is located distal rotor 48 and adjacent second driving disc 64. Similar to driven disc 60, armature 76 includes, at its radial center, a set of index features which are complementary to those of hub 52 and thus armature 76 turns with output shaft 24 but is moveable along hub 52 on output shaft 24.

A washer 80 is located on shaft 24 between hub 52 and a driving gear 84. Driving gear 84 rotates independent of output shaft 24 and includes a set of gear teeth about its periphery. These gear teeth are complementary to a set of worm teeth (not shown) on a prime mover providing input torque to clutch 20.

As can be seen in FIG. 1, driving gear 84 includes an annular ring extending from its face towards core 36 and this annular ring includes on its inner surface a set of index features (in the illustrated embodiment, a set of slots extending along the annular ring toward core 36) which are complementary to a set of index features at the outer periphery of first driving disc 56 and second driving disc 64.

Figure 4:
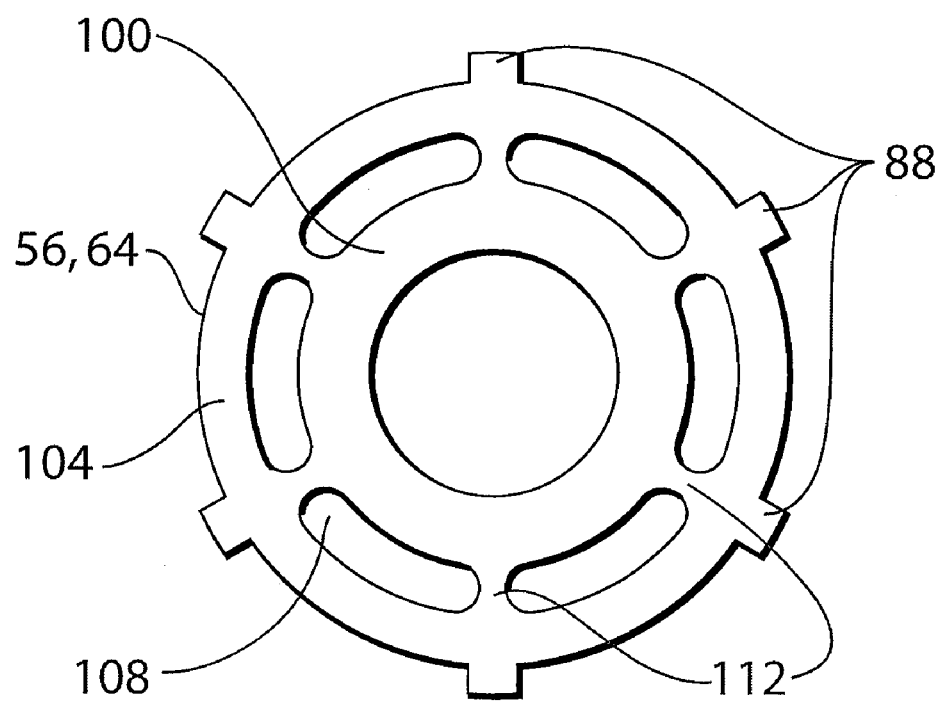
FIG. 4 shows a driving disc used with the magnetic friction clutch of FIG. 1.

In the illustrated embodiment, the index features on first driving disc 56 and second driving disc 64 are in the form of tabs 88, best seen in FIG. 4, which are slidably received in the slots of driving gear 84. Thus, as should now be apparent, while first driving disc 56 and second driving disc 64 can move along output shaft 24, they do not rotate with output shaft 24 and instead rotate with driving gear 84.

While the illustrated embodiment shows a single driven disc 60 and a pair 56, 64 of driving discs, it should be apparent to those of skill in the art that the present invention can alternatively employ a single driving disc located between two driven discs, if desired.

The amount of torque which can effectively be transferred by clutch 20 is limited by the magnitude of the normal force which can be developed when winding 40 is energized and the coefficient of friction developed between the four frictional interfaces in clutch 20, namely: the interface between the surface of rotor 48 and first driving disc 56; the interface between first driving disc 56 and driven disc 60; the interface between driven disc 60 and second driving disc 64; and the interface between second driving disc 64 and armature 76. Thus, increasing the normal force or increasing the coefficient of friction will increase the torque transfer capability of clutch 20.

However, increasing the normal force requires more electrical energy to be provided to winding 40 and this may be undesired or impossible. The coefficient of friction can be increased by applying an appropriate coating or treatment to at least driving discs 56 and 64 and driven disc 60. However, conventional frictional coatings applied to discs in magnetic clutches act to reduce the magnetic flux through the discs and thus reduce the normal force which brings the disc into frictional contact. Thus, in conventional magnetic friction clutches, providing a frictional coating may not provide any increase in torque transfer capability and may in fact reduce the overall ability of the clutch to transfer torque.

In contrast, the present inventors have determined that applying a thermally sprayed (such as high velocity arc sprayed) coating of a suitable magnetically permeable friction material, such as Ferrous Aluminide ($Fe_3Al$ and $FeAl$ and/or $Fe-Al/WC$) can provide an improved frictional coefficient with only a moderate reduction in the magnetic flux through the friction discs.

The present inventors have determined that, in a present embodiment of the invention, when at least the three friction discs have such a coating applied to their contact surfaces, the resulting torque transfer capability of the clutch is about fifty percent higher than an equivalent sized magnetic friction clutch without such a coating.

To achieve such an increase in torque transfer capability, it is desired to carefully design driven disc 60 and first driving disc 56 and second driving disc 64. As can be seen in FIGS. 3 and 4, each of driven disc 60 and first driving disc 56 and second driving disc 64 include an inner annular region 100 and an outer annular region 104 which are separated by air gap slots 108. In order to achieve an acceptable flux density through friction discs 56, 60 and 64, it is desired that the respective areas of inner annular region 100 and outer annular region 104 be substantially the same.

In FIGS. 3 and 4, the presence of the thermally sprayed coating is indicated with the stipple pattern. While in these Figures the connecting straps 112 which connect inner annular region 100 to outer annular region 104 across air gap slots 108, and index features 88 and 62 are shown, for clarity, as not having the thermally sprayed coating, the omission of the coating from these areas is not necessary and thus the coating can be applied to the entire surfaces of the discs, simplifying the coating process.

As will now be apparent to those of skill in the art, in operation of the present invention when winding 40 is de-energized, springs 68 and 72 ensure that little, if any, normal force exists between the faces of rotor 48, armature 76 and the friction faces of driven disc 60, first driving disc 56 and second driving disc 64. Thus, driving gear 84 can rotate independently of output shaft 24.

Conversely, when winding 40 is energized, creating a magnetic field through rotor 48, armature 76 and driven disc 60, first driving disc 56 and second driving disc 64, this magnetic field acts to clamp rotor 48, armature 76 and driven disc 60, first driving disc 56 and second driving disc 64 together, creating a significant normal force at their frictional interface surfaces and thus permitting torque to be transferred to output shaft 24, via rotor 48, driven disc 60 and armature 76 from first driving disc 56 and second driving disc 64 which are driven by driving gear 84.

As a specific example of the present invention, an embodiment of clutch 20 has been constructed with driven disc 60, first driving disc 56 and second driving disc 64 having an outer diameter of about 5.8 centimeters and this embodiment of clutch 20 has a torque transfer capability of as much as thirty Newton-meters (Nm) of torque when the clamping force created by electromagnetic winding 40 is about one thousand Newtons, for an effective friction coefficient for driven disc 60, first driving disc 56 and second driving disc 64 of about 0.4.

The present invention provides a novel magnetic friction clutch which is capable of relatively high torque transfer for friction discs of a given diameter, compared to prior art magnetic clutches. A friction coating with a good magnetic permeability, such as Ferrous Aluminide, or the like, is applied to at least the inner and outer annular regions of the three friction discs and increases the frictional coefficient of the discs with little reduction in the electromagnetic clamping force developed through the clutch.

The above-described embodiments of the invention are intended to be examples of the present invention and alterations and modifications may be effected thereto, by those of skill in the art, without departing from the scope of the invention which is defined solely by the claims appended hereto.

We claim:

1. A magnetic friction clutch, comprising:
   a driving gear to receive torque from a prime mover;
   an output shaft to output torque from the prime mover to a driven device when the clutch is engaged;
   three friction discs:
      a first disc of the three friction discs being a first driving disc, the first driving disc rotating with the drive gear and being moveable along the output shaft;
      a second disc of the friction discs being a first driven disc, the first driven disc rotating with the output shaft; and
      a second driving disc rotating with the drive gear and being moveable along the output shaft, where each friction disc includes a frictional coating applied to its surfaces to enhance the frictional coefficient between respective discs;
   a magnetic circuit including an electromagnetic coil operable, when energized, to clamp the three friction discs together to allow torque to be transferred from a prime mover to a driven device through the friction discs; and
   a rotor which turns with the output shaft and an armature which turns with the driving gear, the rotor making frictional contact with the frictional coating of the first driving disc and the armature making frictional contact with the second driving disc when the magnetic circuit is energized;
   wherein the frictional coating is Ferrous Aluminide.

2. The magnetic friction clutch of claim 1 wherein the frictional coating is applied by thermal spraying.

3. The magnetic friction clutch of claim 1 wherein each of the three friction discs includes an outer annular region separated from an inner annular region by at least two air gaps, the area of the outer annular region being substantially the same as the area of the inner annular region.

4. The magnetic friction clutch of claim 3 wherein the friction coating is applied to the outer annular area and the inner annular area.

5. The magnetic friction clutch of claim 1 wherein each driving disc includes a set of radially outwardly extending tabs to engage the driving gear.

6. The magnetic friction clutch of claim 1 wherein the driven disc includes a set of radially inwardly extending index features to engage a set of complementary index features on the output shaft.

7. The magnetic friction clutch of claim 1 further comprising a magnetic core wherein the electromagnetic coil is located in an annular recess formed between the rotor and the magnetic core.

8. The magnetic friction clutch of claim 1 wherein the frictional coating is also applied to the surfaces of the rotor and armature which contact the driving discs.

9. A magnetic friction clutch, comprising:
   a driving gear to receive torque from a prime mover;
   an output shaft to output torque from the prime mover to a driven device when the clutch is engaged;
   three friction discs, each friction disc having an outer annular region separated from an inner annular region by at least two air gaps, the area of the outer annular region being substantially the same as the area of the inner annular region and wherein a frictional coating is applied to at least the inner annular area and outer annular area of each friction disc:
      a first disc of the three friction discs being a first driving disc rotating with the drive gear and being moveable along the output shaft;
      a second disc of the friction discs being a first driven disc rotating with the output shaft being moveable along the output shaft; and
      a third disc of the friction discs being a second driving disc rotating with the drive gear and being moveable along the output shaft;
   a rotor which turns with the output shaft;
   an armature which turns with the driving gear;
   a magnetic core; and
   a magnetic circuit including an electromagnetic coil located within an annular recess formed between the rotor and the magnetic core, the electromagnetic coil being operable, when energized, to clamp the three friction discs and the armature and rotor together to allow torque to be transferred from a prime mover to a driven device through the friction discs;

wherein the frictional coating is also applied to the rotor and the armature; and wherein the frictional coating is Ferrous Aluminide.

* * * * *